(12) United States Patent
Lynch et al.

(10) Patent No.: US 8,719,163 B2
(45) Date of Patent: *May 6, 2014

(54) METHODS AND SYSTEMS FOR ROUTING PAYMENT TRANSACTIONS

(71) Applicant: Citicorp Credit Services, Inc., New York, NY (US)

(72) Inventors: Sean T. Lynch, Manorville, NY (US); Dickson Chu, New York, NY (US)

(73) Assignee: Citicorp Credit Services, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/025,011

(22) Filed: Sep. 12, 2013

(65) Prior Publication Data

US 2014/0019343 A1   Jan. 16, 2014

Related U.S. Application Data

(63) Continuation of application No. 13/866,176, filed on Apr. 19, 2013, now Pat. No. 8,560,452, which is a continuation of application No. 13/086,212, filed on Apr. 13, 2011, now Pat. No. 8,447,693.

(51) Int. Cl.
*G06Q 40/00* (2012.01)

(52) U.S. Cl.
USPC .................. 705/43; 705/35; 705/38; 705/44; 705/64

(58) Field of Classification Search
USPC .......................................... 705/35, 38, 44, 64
See application file for complete search history.

(56) References Cited

U.S. PATENT DOCUMENTS

| | | | | |
|---|---|---|---|---|
| 7,650,308 | B2 * | 1/2010 | Nguyen et al. | 705/40 |
| 7,665,660 | B2 * | 2/2010 | Degliantoni et al. | 235/383 |
| 7,739,162 | B1 | 6/2010 | Pettay et al. | |
| 7,809,652 | B2 * | 10/2010 | Dixon et al. | 705/76 |
| 7,937,291 | B2 * | 5/2011 | Carlson et al. | 705/26.1 |
| 7,983,987 | B2 * | 7/2011 | Kranzley et al. | 705/44 |
| 8,032,413 | B2 * | 10/2011 | Carlson | 705/14.49 |
| 8,041,634 | B2 * | 10/2011 | Eastley et al. | 705/39 |
| 8,165,940 | B2 * | 4/2012 | Meimes et al. | 705/35 |
| 8,175,963 | B2 * | 5/2012 | Walker et al. | 705/38 |
| 8,219,489 | B2 * | 7/2012 | Patterson | 705/44 |
| 8,266,031 | B2 * | 9/2012 | Norris et al. | 705/35 |
| 8,271,392 | B2 * | 9/2012 | Tomchek et al. | 705/64 |

(Continued)

OTHER PUBLICATIONS

International Search Report and Written Opinion dated Apr. 23, 2012, issued in PCT Application No. PCT/US2012/031968, filed Apr. 3, 2012, pp. 1-8.

(Continued)

*Primary Examiner* — Muriel Tinkler
(74) *Attorney, Agent, or Firm* — John M. Harrington, Esq.; Johnson, Marcou & Isaacs, LLC

(57) ABSTRACT

Methods and systems for routing payment transactions electronically involve interrogating by computer logic each payment transaction received by a payments interface processor to identify a payment destination and a payment source and to determine, according to pre-defined parameters, whether the payment transaction is eligible for processing via an internal payment transaction processor of the financial institution that minimizes processing costs. Eligible payment transactions may be routed, for example, to an internal debit or credit card processor or ACH processor, and ineligible payment transactions may be routed to external card processing networks.

16 Claims, 5 Drawing Sheets

(56) References Cited

U.S. PATENT DOCUMENTS

| | | | |
|---|---|---|---|
| 2005/0027650 A1* | 2/2005 | Walker et al. | 705/38 |
| 2005/0240522 A1* | 10/2005 | Kranzley et al. | 705/40 |
| 2005/0256802 A1* | 11/2005 | Ammermann et al. | 705/44 |
| 2006/0149670 A1* | 7/2006 | Nguyen et al. | 705/39 |
| 2008/0040261 A1 | 2/2008 | Nix et al. | |
| 2008/0059306 A1* | 3/2008 | Fordyce et al. | 705/14 |
| 2008/0059307 A1* | 3/2008 | Fordyce, III et al. | 705/14 |
| 2008/0071587 A1* | 3/2008 | Granucci et al. | 705/5 |
| 2008/0082418 A1* | 4/2008 | Fordyce et al. | 705/14 |
| 2008/0133350 A1* | 6/2008 | White et al. | 705/14 |
| 2008/0133351 A1* | 6/2008 | White et al. | 705/14 |
| 2008/0133409 A1* | 6/2008 | Eastley et al. | 705/40 |
| 2008/0133415 A1 | 6/2008 | Ginter et al. | |
| 2008/0140579 A1* | 6/2008 | Sanjiv | 705/76 |
| 2008/0272188 A1 | 11/2008 | Keithley et al. | |
| 2009/0006203 A1* | 1/2009 | Fordyce et al. | 705/14 |
| 2009/0030793 A1* | 1/2009 | Fordyce, III | 705/14 |
| 2009/0048884 A1* | 2/2009 | Olives et al. | 705/7 |
| 2009/0063334 A1* | 3/2009 | Duncan | 705/39 |
| 2009/0063354 A1* | 3/2009 | Sheets et al. | 705/75 |
| 2009/0070171 A1* | 3/2009 | Patterson | 705/7 |
| 2009/0076896 A1* | 3/2009 | DeWitt et al. | 705/14 |
| 2009/0112661 A1* | 4/2009 | Mullen et al. | 705/7 |
| 2009/0144170 A1 | 6/2009 | Dickelman | |
| 2009/0254462 A1* | 10/2009 | Tomchek et al. | 705/30 |
| 2010/0138288 A1* | 6/2010 | Walker et al. | 705/14.25 |
| 2010/0145810 A1* | 6/2010 | Pourfallah et al. | 705/17 |
| 2010/0211499 A1* | 8/2010 | Zanzot et al. | 705/40 |
| 2010/0268588 A1* | 10/2010 | Lal et al. | 705/14.21 |
| 2010/0287099 A1* | 11/2010 | Liu et al. | 705/44 |
| 2010/0312626 A1* | 12/2010 | Cervenka | 705/14.17 |
| 2010/0312631 A1* | 12/2010 | Cervenka | 705/14.37 |
| 2010/0312633 A1* | 12/2010 | Cervenka | 705/14.38 |
| 2010/0312634 A1* | 12/2010 | Cervenka | 705/14.38 |
| 2011/0029430 A1* | 2/2011 | Norris et al. | 705/39 |
| 2011/0066483 A1* | 3/2011 | Salmon et al. | 705/14.17 |
| 2012/0072347 A1 | 3/2012 | Conway | |
| 2012/0136704 A1* | 5/2012 | Carlson et al. | 705/14.17 |

OTHER PUBLICATIONS

Office Action in U.S. Appl. No. 13/086,212 (now U.S. Granted Patent No. 8,447,693), dated Mar. 27, 2012, pp. 1-11.
Final Office Action in U.S. Appl. No. 13/086,212 (now U.S. Granted Patent No. 8,447,693), dated Oct. 2, 2012, pp. 1-12.
Hogan, "M. Money Management Made Easy," PC World Online, Feb. 1, 1999, pp. 1-4.
Marlin, S. et al., "Unified Vision for a Changing Market," Bank Systems & Technology, Dec. 2001, vol. 38, No. 12, p. A3.
Nance, B., "A Grand Opening for Virtual Storefronts with Middleware," Network Computing, Jun. 1, 1987, vol. 8, No. 10, p. 80.
Anonymous, "Bank Regulation/Thrift Regulation," Banking & Financial Services Policy Report, Nov. 2004, vol. 23, No. 11, ProQuest Central, pp. 1-10.

* cited by examiner

FIG. 3

51 — AN ORIGINATOR IN A FIRST COUNTRY SENDS A REQUEST FROM THE ORIGINATOR'S MOBILE DEVICE TO TRANSFER FUNDS TO A RECIPIENT'S MOBILE DEVICE IN A SECOND COUNTRY WHICH IS RECEIVED BY THE FINANCIAL INSTITUTION INTERFACE PROCESSOR AND VALIDATED

52 — THE LOCATION OF THE DESTINATION MOBILE NUMBER IS DETERMINED USING A LOOK-UP TABLE OF THE DIRECTORY

53 — A FINANCIAL TRANSACTION IS GENERATED TO SECURE THE FUNDS FROM THE ORIGINATOR

54 — ANOTHER FINANCIAL TRANSACTION IS CREATED TO CREDIT THE DESTINATION ACCOUNT IN LOCAL CURRENCY

55 — A CONFIRMATION IS SENT TO THE ORIGINATOR

56 — AN SMS MESSAGE MAY BE SENT TO THE DESTINATION MOBILE NUMBER

57 — THE FINANCIAL INSTITUTION EXECUTES A NORMAL SETTLEMENT BETWEEN THE PARTIES EACH BUSINESS DAY

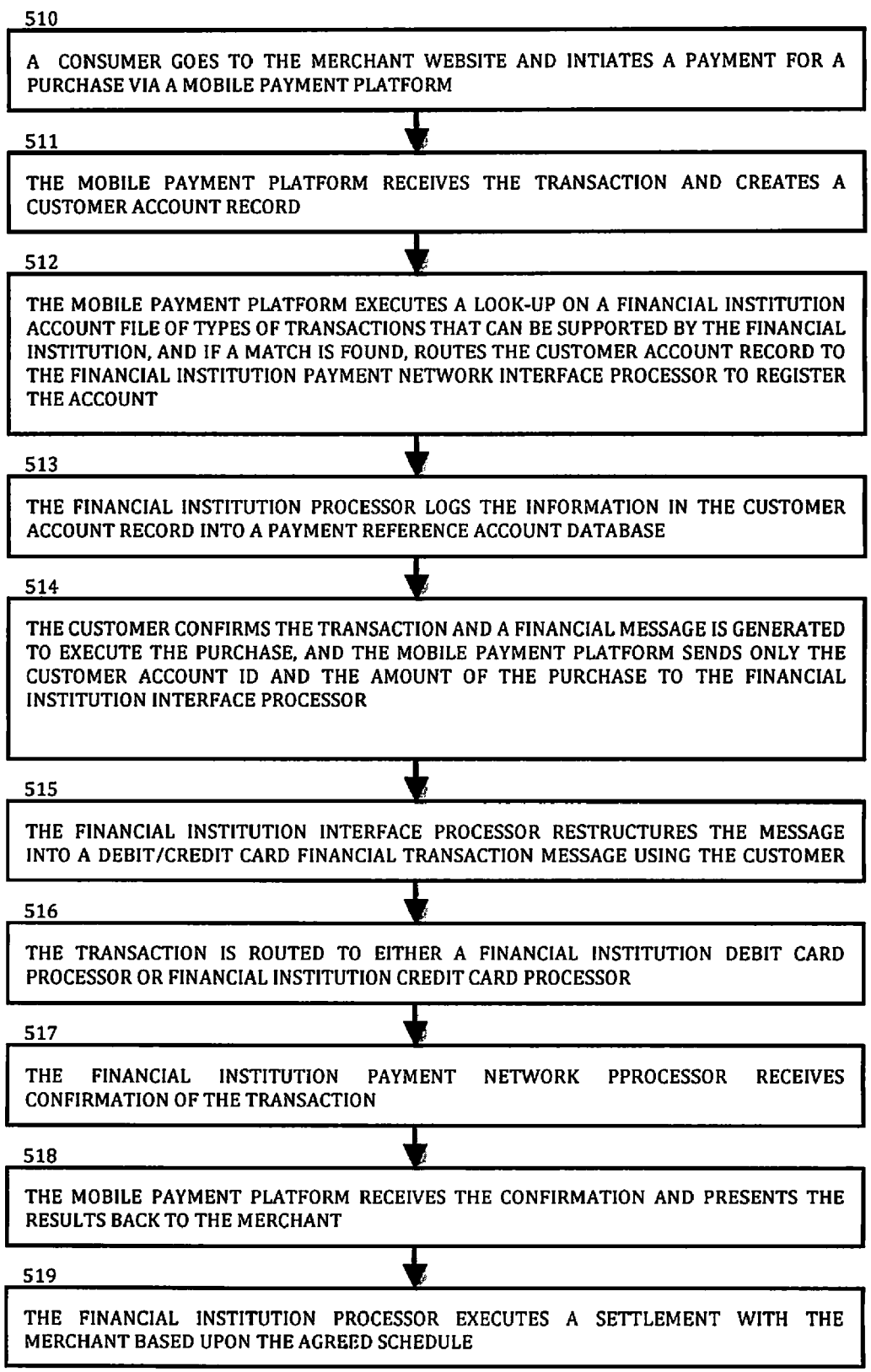

METHODS AND SYSTEMS FOR ROUTING PAYMENT TRANSACTIONS

PRIORITY APPLICATION

This application is a continuation of co-pending U.S. patent application Ser. No. 13/866,176 filed Apr. 19, 2013, entitled "Method and System for Routing Payment Transactions", which was a continuation of U.S. patent application Ser. No. 13/086,212 filed Apr. 13, 2011, entitled "Method and System for Routing Payment Transactions" (now U.S. Pat. No. 8,447,693), each of which is incorporated herein by this reference.

FIELD OF THE INVENTION

The present invention relates generally to the filed of electronic commerce, and more particularly to methods and systems for routing customer payment transactions electronically.

BACKGROUND OF THE INVENTION

Currently, payment transactions between a customer and a merchant with credit and/or debit cards are typically routed, for example, from the merchant's point of sale terminal to the card issuer via a merchant's financial institution processor and a card network. The merchant pays discount fees to the merchant's financial institution processor to cover the cost of processing and interchange fees to the card issuer and the card network for accepting cards. For example, when a customer purchases an item from a merchant using a debit or credit card for payment, the merchant captures and logs the transaction and sends the transaction to a merchant processor or acquirer. The merchant processor routes the transaction to the appropriate card network and charges a fee for transaction processing to the merchant and also passes any interchange fee, based upon a merchant category code and processing code, to the merchant.

Upon receiving the transaction, the card network identifies the card issuer and routes the transaction to the card issuer, receives an acknowledgement of the transaction result from the issuer, and the card network charges a processing/switch fee to the issuer and an interchange fee to the merchant processor or acquirer. The card network passes the transaction result to the merchant processor or acquirer, which in turn passes the transaction result to the merchant. If the transaction result is approved, the purchase is completed, the merchant sends an email or mobile notification of the transaction to the customer, and the merchant's account is logged with the transaction. Finally, the card network settles each day's business with the card issuer and the merchant processor or acquirer, and the merchant processor or acquirer settles with the merchant. The fees which merchants currently pay for the privilege of accepting credit/debit cards are significant, especially for smaller merchants who, for example, may lack leverage to negotiate lower fees.

Currently, the financial services industry is struggling with payment processing issues, such as credit and debit card payment processing issues. Timing and expense are important, for example, to merchants who prefer to receive customer payments as soon as possible. While there are technologies available to expedite the payment, each has its separate cost. Financial institutions would like to be able to offer a reduction in the cost of performing such payment transactions and, at the same time, generate incremental revenue while managing their liquidity position.

The financial services industry is also currently struggling to answer the question of the fastest way to route a payment, for example, to a particular financial institution. A present focus is on using, for example, the automated clearing house (ACH) process. Another present focus is on a high-tech process, sometimes referred to as the automated teller machine (ATM) rail or debit rail using card association networks, such as VISA® and MASTERCARD® processing networks by which payment transactions are executed in what is considered to be real-time.

However, these alternatives can be very expensive. ACH transactions can cost from 2 cents to 4 cents per transaction, and card association network fees, such as those imposed by VISA® or MASTERCARD® processing networks, for example, can be, e.g., $4-$5 for a $300 payment.

Accordingly, there is a current need for a global financial institution with major authorization systems to numerous countries worldwide and an extensive corporate client population to move money in a way that can optimize the transaction with the least associated expense while meeting the customer's needs to have payment transactions executed in real-time or near real-time.

SUMMARY OF THE INVENTION

Embodiments of the invention provide methods and systems for routing payment transactions electronically that enable a financial institution to move money effectively and the least expensive way, while meeting the client's expectations and at the same time generating incremental income for the financial institution.

An aspect of embodiments of the invention drives transactions to lower cost channels with an acceptance of associated risk which can involve, for example, batching lower cost debit and credit transactions prior to processing and leveraging non-card number routing keys, such as email addresses and mobile phone numbers.

A further aspect of embodiments of the invention involves establishing a closed loop (i.e. a financial institution private payment network) of accounts for both customers and non-customers of the financial institution. The consumer and commercial accounts are leveraged and merchants 'register' customers into a closed-loop framework using demand deposit account and wallet-related information, resulting in lower payment processing rates.

Another aspect of embodiments of the invention integrates rewards programs of the financial institution and merchants that can be leveraged as an alternate currency for purchases.

An additional aspect of embodiments of the invention provides payment rates based upon settlement timing such that, for example, immediate funds incur a higher rate than non-immediate funds.

Thus, embodiments of the invention leverage the financial institution's reach and payments capabilities to route payment processing via a least-cost channel and provide merchants a single overall interchange rate/fee that is substantially less than currently imposed.

Embodiments of the invention employ computer hardware and software, including without limitation, one or more processors coupled to memory and non-transitory computer-readable storage media with one or more executable programs stored thereon which instruct the processors to perform methods and systems for routing payment transactions electronically described herein. In one embodiment, a payment transaction directed to a payee payment destination is received, using a first party payments interface processor, from a payor payment source. The payment transaction is interrogated, using the payments interface processor, to identify a payment processing path and to determine, according to pre-defined parameters, whether the payment transaction is eligible for processing via an internal payment transaction processing path of the first party. The parameters for determining that the payment transaction is eligible consist at least in part of whether the payment transaction has as a payor payment source an account with the first party and as a payee payment destination an account with the first party In such embodiment, eligible payment transactions are routed, using the payments interface processor, to an internal payment transaction processing path of the first party. In such cases eligible transactions are settled without routing the transaction to external card processing networks. Alternative payment processing paths are identified for non-eligible payment transactions. In addition, transaction costs of such alternative payment processing paths are determined. Non-eligible payment transactions are routed, using the payments interface processor, to a payment processing path other than the internal payment transaction processing path. A determination of which payment processing path is selected according to parameters consisting at least in part of relative transaction costs. Further, automated clearing house payment transactions may be routed, using the payments interface processor, to an internal automated clearing house processor of the first party for processing.

Additionally, the payment transaction that is received using the payments interface processor may include a payment transaction entered on a digital communication device, such as a smartphone, a tablet computer, a portable media player, a PDA, a Wi-Fi mobile platform, a website, a desktop, a laptop, a notebook computer, or any other suitable digital device. For example, such a payment transaction may be received via a merchant website.

In one aspect of such embodiment, interrogating the payment transaction to identify the payment processing path may involve identifying, using the payments interface processor, the payee payment destination from a directory of payee payment destinations. Identifying the payee payment destination may also involve identifying, using the payments interface processor, a pre-paid merchant demand deposit account with the first party as the payee payment destination from a look-up table of the directory of payee payment destinations.

In another aspect, interrogating the payment transaction to identify the payment processing path may involve identifying, using the payments interface processor, the payor payment source from a directory of payor payment sources. Identifying the payor payment source may also involve identifying, using the payments interface processor, a consumer debit card account, a consumer credit card account, or a consumer demand deposit account as the payor payment source from a look-up table of consumer accounts of the directory of payor payment sources.

In a further aspect of such embodiment, identifying the debit card account, the credit card account, or the consumer demand deposit account may involve, for example, identifying, using the payments interface processor, the consumer debit card account, the consumer credit card account, or the consumer demand deposit account as the payor payment source from a look-up table of consumer mobile numbers or email addresses linked to respective consumer debit card accounts, consumer credit card accounts, or consumer demand deposit accounts in the directory of payor payment sources.

An additional aspect may involve, for example, processing, using an internal debit card payment processor, an eligible payment transaction having a debit card account as the payor payment source, and settling, using the internal debit card payment transaction processor, the processed payment transaction by debiting the payor payment source and crediting the payee payment destination less a processing fee.

In another aspect of such embodiment, processing the eligible payment transaction having a debit card account as the payor payment source may involve generating, using the internal debit card payment transaction processor, at least an authorization request message and an acquirer financial request for funds message to an entity other than the first party which issued the debit card account. Still another aspect may involve, for example, batching, using the internal debit card payment transaction processor, the processed payment transaction and crediting the batched payment transaction to a payee payment destination account on a pre-determined periodic basis, which payee payment destination account may comprise a pre-paid merchant demand deposit account with the first party.

A still further aspect of such embodiment may involve, for example, processing, using an internal credit card payment transaction processor, the eligible payment transaction having a credit card account as a payor payment source, both as a merchant acquirer of the payment transaction and an issuer of the credit card account. The processed payment transaction is settled, using the internal credit card payment transaction processor, by debiting the payor payment source and crediting the payee payment destination less a processing fee and/or batching, using the internal credit card payment transaction processor, the processed payment transaction and crediting the batched payment transaction to a payee payment destination account on a pre-determined periodic basis, which payee payment destination account may comprise a pre-paid merchant demand deposit account with the first party.

Another embodiment involves, for example, receiving, using a financial institution payments interface processor, payment transactions and interrogating, using the payments interface processor, each of the payment transactions to identify a payment destination and a payment source and to determine, according to pre-defined parameters, whether the payment transaction is eligible for processing via an internal payment transaction process of the financial institution. The parameters for determining that the payment transaction is eligible may consist at least in part of payment transactions having as a payment source a debit or credit card account issued by the financial institution (i.e., "on-us") or a debit card account issued by an entity other than the financial institution (i.e., "off-us") and a payment destination that is an obligation to the financial institution. Eligible payment transactions having a debit card account as a payment source are routed, using the payments interface processor to an internal debit card payment transaction processor of the financial institution for processing, and eligible payment transactions having a credit card account as a payment source are routed to an internal credit card payment transaction processor of the financial institution for processing.

In such other embodiment, non-eligible payment transactions having a debit card account issued by an entity other than the financial institution ("off-us") as a payment source and a payment destination other than an obligation to the financial institution may be routed, using the payments interface processor, to an external regional card processing network (which is less costly than external card association networks) for processing. Non-eligible ("off-us") payment transactions having a credit card account as a payment source are routed, using the payments interface processor, to an external card association network for processing. Further, automated clearing house payment transactions may be routed to an internal automated clearing house processor of the financial institution for processing.

In addition, the payment transactions that are received using the payments interface processor may include, for example, payment transactions entered on digital communication devices (e.g., smartphones, tablet computers, portable media players, PDA's, Wi-Fi mobile platforms, websites, desktops, laptops, notebook computers, etc.), and such payment transactions may be received via merchant websites.

In an aspect of such other embodiment, interrogating each of the payment transactions to identify a payment destination may involve, for example, identifying, using the payments interface processor, the payment destination from a directory of payment destinations. Identifying the payment destination may involve identifying, using the payments interface processor, a pre-paid merchant demand deposit account with the financial institution as the payment destination from a look-up table of the directory of payment destinations.

In another aspect, interrogating each of the payment transactions to identify a payment source may involve identifying, using the payments interface processor, the payment source from a directory of payment sources. Identifying the payment source may further involve identifying, using the payments interface processor, a consumer debit card account, a consumer credit card account, or a consumer demand deposit account as the payment source from a look-up table of consumer accounts of the directory of payment sources.

In an additional aspect of such other embodiment, identifying the debit card account, the credit card account, or the consumer demand deposit account may involve, for example, identifying, using the payments interface processor, the consumer debit card account, the consumer credit card account, or the consumer demand deposit account as the payment source from a look-up table of consumer mobile numbers or email addresses linked to respective consumer debit card accounts, consumer credit card accounts, or consumer demand deposit accounts in the directory of payment sources.

A further aspect may involve, for example, processing, using the internal debit card payment transaction processor, the eligible payment transactions having a debit card account as the payment source, and settling, using the internal debit card payment transaction processor, the processed payment transactions by debiting the payment source and crediting the payment destination less a financial institution processing fee.

In a still further aspect of such other embodiment, processing the eligible payment transactions having a debit card account issued by an entity other than the financial institution as the payment source may involve, for example, generating, using the internal debit card payment transaction processor, at least an authorization request message and an acquirer financial request for funds message to the entity other than the financial institution.

An additional aspect may involve, for example, batching, using the internal debit card payment transaction processor, the processed payment transactions and crediting the batched payment transactions to a payment destination account on a pre-determined periodic basis, which payment destination may comprise a pre-paid merchant demand deposit account with the financial institution.

Still another aspect of such other embodiment may involve, for example, processing, using the internal credit card payment transaction processor, the eligible payment transactions having a credit card account as a payment source, both as a merchant acquirer of the payment transaction and as an issuer of the credit card account. The processed payment transaction is settled, using the internal credit card payment transaction processor, by debiting the payment source and crediting the payment destination less a financial institution processing fee, and/or batching, using the internal credit card payment transaction processor, the processed payment transactions and crediting the batched payment transactions to a payment destination account on a pre-determined periodic basis, which payment may comprise a pre-paid merchant demand deposit account with the financial institution.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 3 is a flow chart which illustrates an example of the process of executing a cross-border funds transfer according to embodiments of the invention using only a mobile number as the sending and destination points;

FIG. 5 is a flow chart which illustrates an example of the process of executing a payment transaction for an international website for embodiments of the invention.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention propose methods and systems for routing payment transactions electronically in which, once a payment transaction is received at a financial institution processor platform, computer logic determines how best to route the transaction. Such a determination is based, for example, on whether the transaction involves a card processing function of the financial institution, whether the transaction involves a retail side of the financial institution, whether the transaction involves funds destined for a financial institution consumer account, and/or whether the transaction involves funds destined for a financial institution corporate account.

Figure 1:
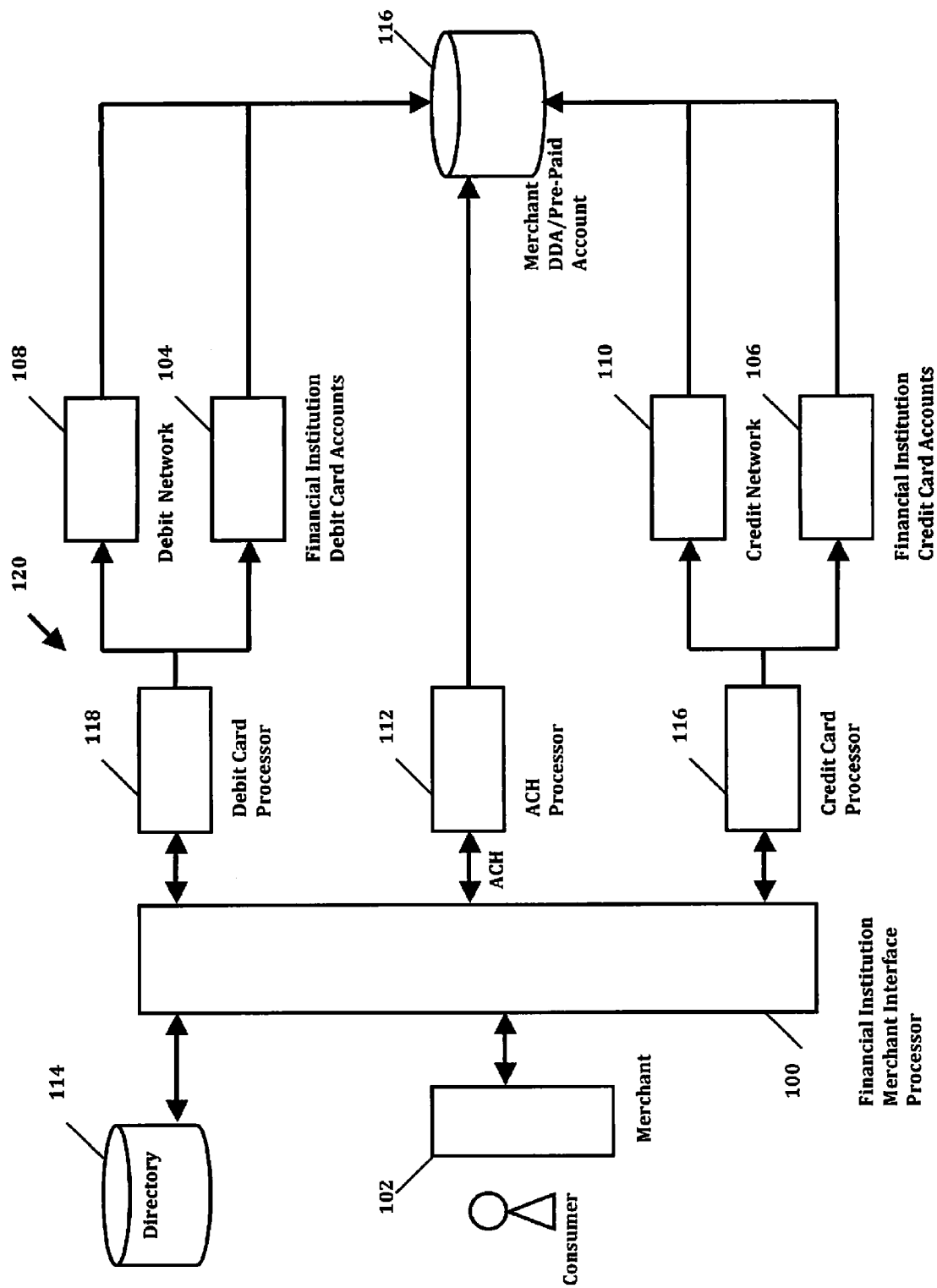
FIG. 1 is a schematic flow chart which illustrates an example of components and the flow of information between components in a payment processing system that employs a closed-loop alternative for embodiments of the invention.

FIG. 1 is a schematic flow chart which illustrates an example of components and the flow of information between components in a payment processing system which employs a closed-loop alternative for embodiments of the invention. Referring to FIG. 1, according to an embodiment of the invention, at least "on-us" debit and/or credit card transactions (i.e., the financial institution is both the acquirer and the issuer) may be routed via an interface processor 100 between the merchant 102 and the financial institution to the financial institution's internal merchant acquiring framework shown generally as 120 for processing under its acquiring license without involving a card processing network 108, 110, while non "on-us" (referred to herein as "off-us") debit and/or credit card transactions may be routed through the debit or credit card processing network 108, 110. Referring further to FIG. 1, ACH processing may be handled by a transaction processing unit 112 of the financial institution, which may also support check imaging if presented.

As an example of payment transaction processing for embodiments of the invention, assume a consumer payment transaction is received at the financial institution via an on-line banking website to pay the consumer's telephone company bill. Rather than routing the payment transaction to either an ACH channel 112 or a card association network channel, 108, 110 embodiments of the invention utilize a corporate directory 114 or look-up table by which internal logic of the financial institution determines that the payee telephone company is a corporate client of the financial institution and posts the payment to a financial institution account 116 of the telephone company on the particular date by which the consumer requested the payment be made. Thus, in the example, the transaction never really leaves the financial institution but is basically a book transfer of the balance. A corresponding value proposition for the financial institution is that the financial institution actually has use of the money between extracting it from the consumer's retail account and crediting it to the telephone company's corporate account. Assuming a significant dollar volume of such transactions occurring during the course of each day and batching up such transactions, the interest income to the financial institution is likewise significant.

An aspect of embodiments of the invention involves providing computer logic for merchants' strategic payment mechanisms. For example, merchants may currently pay very high interchange rates and fees for processing consumer payments through a card association network channel 108, 110. Such computer logic routes consumer payment transactions for those merchants electronically to the financial institution via a financial institution interface processor 100 for processing according to embodiments of the invention, whereby those transactions can be settled internally by the financial institution at considerable savings, both from the consumer perspective and the corporate perspective. Thus, embodiments of the invention provide a strong value proposition to merchants to do business with a particular financial institution. Such merchants become part of the directory 114 or look-up table of corporate clients of the financial institution. Such directory 114 or look-up table may be referred to as a closed loop directory, inasmuch as "closed loop" may be said to characterize aspects of methods and systems for embodiments of the invention.

Embodiments of the invention employ a financial institution card processor 116, 118 in communication with card processing networks 108, 110 of various global card associations, such as VISA® and MASTERCARD®, and various regional card processing networks such as NYCE® and STAR®, that routes transactions, for example, according to account numbers. However, internal logic employed by embodiments of the invention not only routes transactions based on account numbers but also routes transactions based on other identifiers, such as consumer email addresses or cell phone numbers, which are relatively unique to an individual consumer account. Thus, embodiments of the invention may determine if a transaction can be supported by a financial institution's private payment network 104, 106 and support various payment keys, such as debit/credit card account numbers, email addresses, and mobile phone numbers. Further embodiments of the invention provide least-costs routing based upon merchant status, risk, and activity parameters. Embodiments of the invention may be a centrally housed or provided directly to a merchant, e.g., at the acquiring point.

Embodiments of the invention provide functions/features, such as eligibility determination, transaction batching, imaging/ACH processing, alternative routing keys, and merchant activity scoring. The eligibility function determines if a particular transaction is eligible for the payments network 104, 106 for embodiments of the invention. Associated with this function is an index 114 of addresses that are supported, and the eligibility function can be located, for example, at the merchant or at the financial institution. In the transaction batching function, debit/credit card transactions are batched up for frequent small transactions. This transaction batching function reduces the interchange and processing fees but assumes more risk for the financial institution. The financial institution can reduce the degree of risk, for example, by executing a balance inquiry to determine if a customer's account is in good standing. In the imaging/ACH processing function, demand deposit account and R&T information is captured from a check image transaction as a back end process when an image is processed to upload the setting for a particular account.

In the alternate routing key function, an email address and/or mobile phone number associated with a customer can used as a sub-key for the customer's account for email or mobile based payment services. In this function, destination accounts may be registered. In one aspect, all financial institution accounts may be pre-registered. Based upon activity and other factors, the marketing function may suggest products/services to merchants and buyers via the email receipt or other channels. The merchant activity function may score customers to determine if an alternate channel can be used, such as ACH instead of debit card, based for example on frequency, dollar volume parameters and claims activity.

Figure 2:
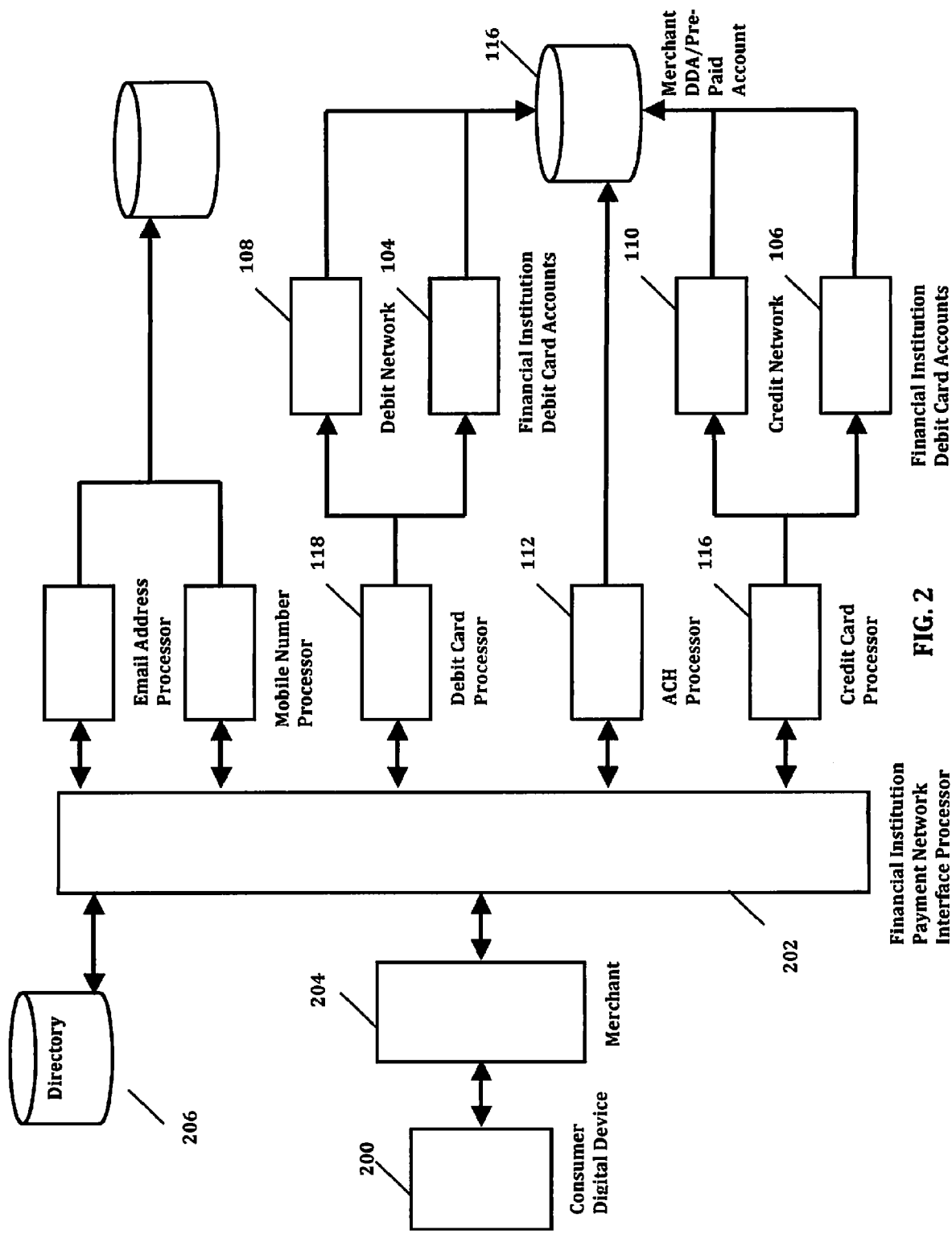
FIG. 2 is a schematic flow chart which illustrates an example of components and the flow of information between components in payment transaction processing system that employs the closed-loop alternate for other embodiments of the invention where payments are routed using a mobile phone number or email address in addition to traditional methods.

FIG. 2 is a schematic flow chart which illustrates an example of components and the flow of information between components in payment transaction processing system which employs the closed-loop alternate where payments are routed using a mobile phone number or email address in addition to traditional methods. In this aspect, merchants may have their customers opt into the closed loop network to generate savings. Referring to FIG. 2, transactions for customers with companies that provide for online payment using various digital devices 200, such as smartphones, tablet computers, portable media players, PDA's, Wi-Fi mobile platforms, websites, and the like, are routed via a financial institution interface processor 202. Thus, according to embodiments of the invention, if a merchant 204 sends a payment transaction to a financial institution in which the consumer is identified only by a cell phone number or an email account, the financial institution can perform the look-up on the closed-loop directory 206. If the look-up confirms that the financial institution has corresponding accounts for the consumer and the merchant, according to embodiments of the invention, the payment transaction can be processed internally at a significant cost savings to the merchant, while providing an incremental income for the financial institution.

Referring to FIG. 2, embodiments of the invention employ, for example, a financial institution interface processor 202 that identifies and extracts certain types of payment transactions. For example, the financial institution interface processor 202 determines whether a payment transaction is "on-us" (i.e., the financial institution is both the card issuer and the merchant acquirer) or "off-us" (i.e., the financial institution is not the card issuer). In the latter case, for example, the financial institution may receive a payment transaction for a merchant 204, which is a financial institution client, with a consumer 200 using the consumer's VISA® card issued by a different financial institution. If the logic of the financial interface processor 202 makes a determination that the payment transaction is not on "on-us" transaction using, for example, a financial institution-issued credit/debit card, but is instead an "off-us" transaction using, for example, a credit/debit card issued by another financial institution, such as another financial institution's VISA® card, the financial institution interface processor 202 routes the transaction via the financial institution acquirer processor 116 to a card association network 110.

Thus, a determination is made at the financial institution interface processor 202 via the interface processor logic for embodiments of the invention as to whether a particular payment transaction is "on-us" or "off-us". Upon receiving a payment transaction with a card account number, the interface processor logic determines whether the transaction is an ACH transaction, a credit card transaction, or a debit card transaction. Assuming that the logic determines that the transaction is, for example, a debit card transaction, the logic looks at the bank identification number (BIN) associated with the transaction to determine whether the transaction is a financial institution BIN or a non-financial institution BIN. If the logic for embodiments of the invention determines that the BIN associated with the transaction is a non-financial institution BIN, the transaction may be routed, for example, to a card association network 108, such as the VISA® or MASTERCARD® network, in which case the transaction will cost the merchant up to 4 or 5 percent of the overall transaction. On the other hand, routing the payment transaction according to embodiments of the invention to a regional network may be 25 percent to 75 percent less costly.

Referring to FIG. 2, embodiments of the invention involve, for example, settling by the financial institution the merchant demand deposit accounts (DDA's) 116 (i.e., pre-paid accounts that the financial institution settles with a particular merchant, upon which the merchant may draw, on a regular basis). For example, the merchant may set up a pre-paid account 116 with the financial institution, and periodically, such as each week, the financial institution credits that account 116 with the amount of money owed to the merchant less any fees for services. The merchant, as part of its relationship, can then draw upon that account 116 for the merchant's bills, payroll and the like.

As illustrated in FIG. 2, embodiments of the invention eliminate processing payment transactions through the card association networks 108, 110 altogether in cases where the financial institution is both the issuer and acquirer. For processing "off-us" credit card payment transactions, the financial institution is primarily limited to particular card association networks, such as the VISA®, MASTERCARD®, or AMERICAN EXPRESS® network. However, there are many different debit card processing networks 108 to which the financial institution can route "off-us" debit card transactions. For example, assume a consumer uses an "off-us" VISA® debit card to make a payment on an obligation owed to the financial institution. When such a transaction is identified by logic for embodiments of the invention, a message such an authorization request message according to the ISO 8583 standard is generated to the bank that issued the debit card to verify that the consumer has an account with that bank and that the account is in good standing. A transaction message, such as an acquirer financial request for funds according to the ISO 8583 standard is then generated and routed to the debit card issuer. Thus, instead of paying $3 to $4 per transaction for one of the card association networks to process the transaction, the cost is a flat fee of 75 cents per transaction.

Referring to FIG. 2, an aspect of the invention also provides logic that detects the use by a consumer of a mobile number or email address in a payment transaction and a directory 206 or look-up table of consumer mobile numbers and/or email addresses. Thus, if the financial institution receives an email account from a vendor 204 that has a payment associated with it, such logic is able to utilize the directory 206 to translate the email address to an individual who has, for example, a consumer account with the financial institution and the transaction can be routed in the fastest, least costly way. Further, logic for embodiments of the invention interrogates any transaction received at the financial institution interface processor 202, whether it is received as an email account, a mobile number, a traditional bank account number, or a debit or credit card number. Logic for embodiments of the invention uses the directory 206 to translate the transaction and then to route the transaction through the appropriate channel that is, for example, the least costly process.

Currently, furnishing email addresses and mobile numbers when registering with on-line merchants has become a standard practice. Most of the email address and mobile number listings for the directory 206 for embodiments of the invention may typically be obtained, for example, from on-line merchants who receive that information when their customers register with them and they in turn pass the email addresses and mobile numbers on to the financial institution. Another source of email addresses and mobile numbers for the directory 206 may be the registration of financial institution customers for on-line banking services during which they are asked to enter such information.

Referring further to FIG. 2, for an example of an "on-us" closed loop payment transaction using a debit card account number for embodiments of the invention, assume a financial institution customer makes a purchase from an on-line merchant 204 and enters his or her mobile phone number or email address on his or her digital device 200. Assume also that the customer pays using his or her financial institution debit card account. When the debit is received at the financial institution interface processor 202, the transaction is interrogated by logic for the customer's mobile number and/or email address, the customer is identified from the directory 206 of mobile numbers and email addresses. The debit transaction is routed internally to debit the customer's account with the financial institution for the purchase price and credit the merchant's account with the financial institution for the purchase price less a small fee charged by the financial institution for handling the transaction internally, which is much less than typical processing fees charged by debit card networks.

For an example of an "on-us" closed loop payment transaction using a credit card account number for embodiments of the invention, assume a financial institution customer makes a purchase from an on-line merchant using his financial institution credit card account number. When the transaction is received at the financial institution interface processor 202, it is likewise interrogated by logic for the customer's credit card account number, and the credit card transaction is routed internally with the financial institution functioning as both merchant acquirer and issuer. The customer's credit card account with the financial institution is debited for the purchase price and the merchant's account with the financial institution is credited for the purchase price less the small fee charged by the financial institution for handling the transaction internally, which is again considerably less than typical credit card network fees.

For an example of an "on-us" closed loop payment transaction using only the customer's mobile number of email address for embodiments of the invention, assume a financial institution customer wants to make a purchase from the I-TUNES STORE®, enters his or her mobile phone number or email address on his or her digital device 200, but does not have his or her credit card number readily available. When the transaction is received at the financial institution interface processor 202, the transaction is again interrogated by logic for the customer's mobile number and/or email address, and the customer is identified from the directory 206 of mobile numbers and email addresses. In this example, the customer may have the financial institution link his or her credit card account number to his or her mobile number and/or email address in the directory 206. Thus, the customer's credit card account can be identified from the directory as well, and the credit card transaction is routed internally with the financial institution again functioning as both merchant acquirer and issuer. The customer's credit card account with the financial institution is debited for the purchase price and the merchant's account with the financial is credited for the purchase price less the small fee charged by the financial institution for handling the transaction internally, which is again considerably less than typical credit card network fees.

In the case of an "off-us" credit card transaction in which the customer's mobile number and/or email address is in the directory 206 and linked, for example, at the customer's request to an "off-us" credit card account, when the customer makes a purchase from an on-line digital media merchant 204, such as the I-TUNES STORE®, and enters his or her mobile phone number or email address on his or her digital device 200, but does not have his or her "off-us" credit card number readily available, the customer's "off-us" credit card account can be identified from the directory 206, and the credit card transaction is routed to the appropriate credit card processing network 110 for processing.

In another aspect of the invention, depending for example on the size of payment transactions, such as micropayments, and the number and history of fraud activity of typical transactions for a particular merchant, the financial institution may choose to batch and combine numerous small payments into one transaction to execute at one time, especially if they are "off-us" transactions. Such batching may reduce the cost of processing those transactions.

Methods and systems for embodiments of the invention enable a financial institution, such as a global bank, to generate incremental revenue by providing a payments/merchant acquiring service for companies that provide online payments using various digital devices, such as smartphones, tablet computers, portable media players, PDA's, Wi-Fi mobile platforms, websites, and the like. A key feature of embodiments of the invention is execution of payments by the financial institution at a lower cost than the cost of using existing merchant processors, which currently process merchants' debit and credit card transactions, reimburse the merchants for the value of the sales, and charge the merchants a fee/commission for the services they provide under contractual agreements with the merchants. Embodiments of the invention integrate the financial institution into the registration and payment execution process, which results in incremental volume and revenue for services. A key to such integration is the provision of a value proposition to merchants that ensures their success, and ensures the success of the financial institution.

Embodiments of the invention enable the financial institution to offer numerous new services such as payment processing to support debit/credit card transactions and automated clearing house transactions; new accounts, such as demand deposit accounts and credit card accounts, all of which new accounts may be offered by the financial institution as part of an enrollment process; alternative payments, such as a bill-me-later type service or leverage of reward programs as payments instead of cash at POS terminals; a specific single processing rate for merchants regardless of payment type based upon settlement time frame; and cross border fees using the financial institution's reach and cross border execution capabilities to provide FX processing and settlement in any currency. Other new financial institution services enabled by embodiments of the invention include, for example, cross product sales by monitoring small business client activity and suggesting other low cost business solutions to small business merchants; providing check image processing to merchants for automated clearing house payments; fixed rate claim/adjustment services; and merchant acquiring by underwriting small merchant businesses.

One example of such new financial institution services enabled by embodiments of the invention are cross-border funds transfers. FIG. 3 is a flow chart which illustrates an example of the process of executing a cross-border funds transfer according to embodiments of the invention using only a mobile number as the sending and destination points. Referring to FIG. 3, at S1, an originator in a first country (e.g., a financial institution customer in Singapore) sends a request from the originator's mobile device to transfer funds to a recipient's mobile device in a second country (e.g. a financial institution customer in Japan) which is received by the financial institution interface processor 202 and validated. At S2, the location of the destination mobile number is determined (e.g. Japan) using a look-up table of the directory 206, and at S3, a financial transaction is generated to secure the funds from the originator. Once this is done successfully, at S4, another financial transaction is created to credit the destination account in local currency, and at S5, a confirmation is sent to the originator. In addition, at S6, an SMS message may be sent to the destination mobile number to alert the owner of the destination account of the transfer. At S7, the financial institution executes a normal settlement between the parties each business day. The cross-border funds transfer function of embodiments of the invention can support in-country routing, non-financial institution services and a closed loop framework.

Figure 4:
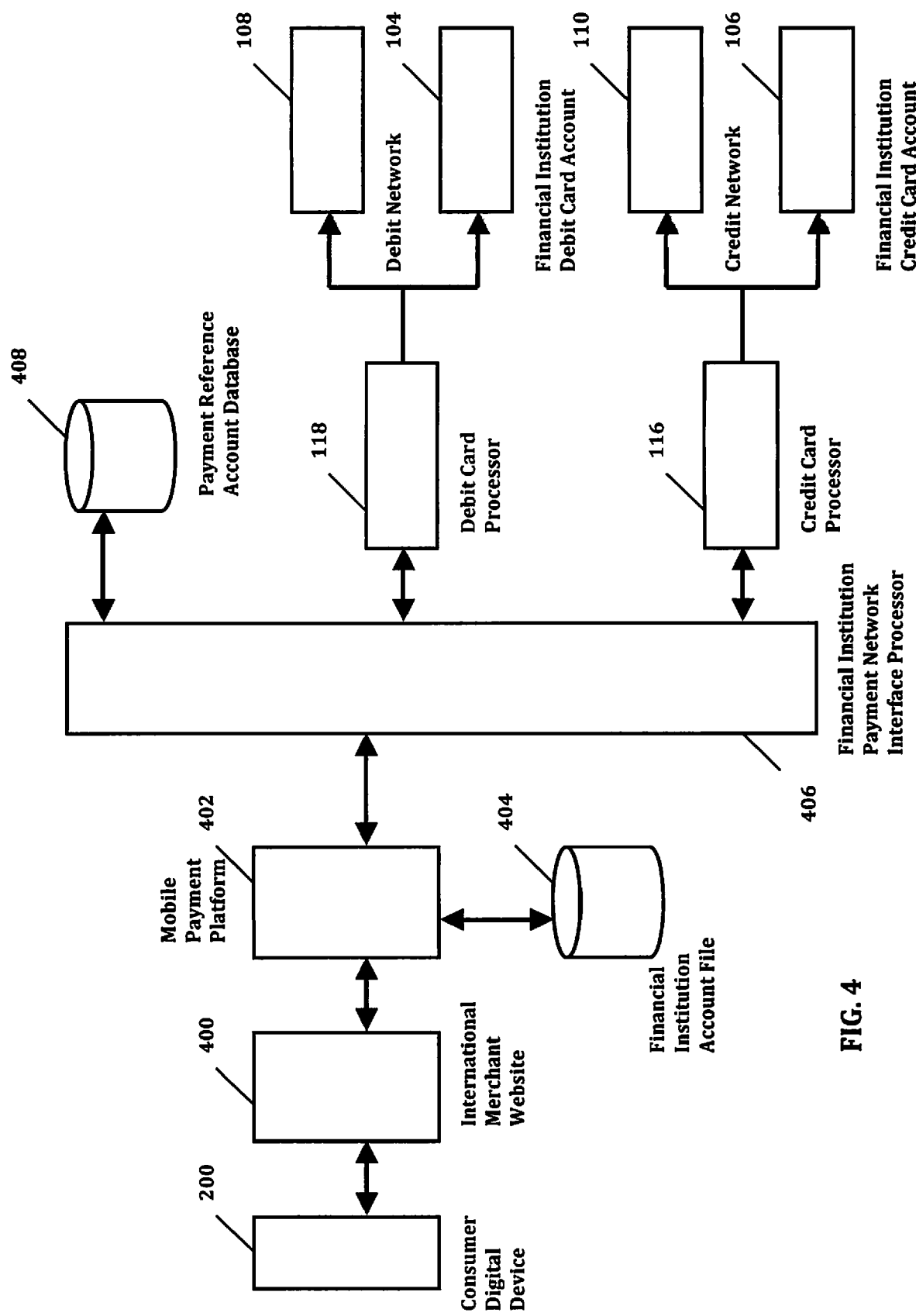
FIG. 4 is a schematic flow chart that illustrates and example of components and the flow of information between components for a payment transaction on an international website for embodiments of the invention.

Another example of such new financial institution services enabled by embodiments of the invention are payment transactions for international websites. FIG. 4 is a schematic flow chart that illustrates an example of components and the flow of information between components for a payment transaction on an international website. FIG. 5 is a flow chart which illustrates an example of the process of executing a payment transaction for an international website for embodiments of the invention. Referring to FIGS. 4 and 5, a consumer with a digital device 200 may go to an international merchant website 400 and complete a registration process for the financial institution. Once again, the financial institution is able to perform a batch-up of transactions via the website and route any transactions to any of the card association networks. In the case of a merchant that is international, a global financial institution can route transactions internationally, for example, to its operations in various foreign countries. Referring again to FIGS. 4 and 5, at S10, a consumer goes to the merchant website 400, such as an airline website, and initiates a payment for a purchase, such as an airline ticket, via a mobile payment platform 402. At S11, the mobile payment platform 402 receives the transaction and creates a customer account record.

Thereafter, at S12, the mobile payment platform 402 executes a look-up on a financial institution account file 404 of types of transactions that can be supported by the financial institution, and if a match is found, routes the customer account record to the financial institution payment network interface processor 406 to register the account. Information in the customer account record includes, for example, the customer's funding account information, name, and address. At S13, the financial institution logs this information into a payment reference account database 408. At S14, the customer confirms the transaction and a financial message is generated to purchase, for example, the ticket, and the mobile payment platforms 402 sends only the customer account ID and the amount of the purchase. At S15, the financial institution interface processor 406 receives the transaction and restructures the message into a debit/credit card financial transaction message, such as an ISO 8583 message, using the customer database 408.

At S16, the transaction is routed to either a financial institution debit card processor 118, if a debit card transaction, or a financial institution credit card processor, 116, if a credit card transaction, and at S17, the financial institution payment network receives confirmation of the transaction or a reason code for failure of the transaction. At S18, the mobile payment platform 402 receives the confirmation and presents the results back to the merchant 400. At S19, the financial institution executes a settlement with the merchant based upon the agreed schedule, such as daily, weekly, or monthly.

It is to be noted, that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be noted that such computer-readable media may include, but are not limited to, electronic, optical, magnetic, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further noted that client devices that my be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

GLOSSARY

ACH or automated clearinghouse: An electronic network for financial transactions.

Credit card: A card entitling the cardholder to use funds from a card issuer.

Card association: An organization that licenses its branded card programs and processes card transactions.

Card association network: The network of a card association that processes card transactions for a fee.

Card issuer: The entity that issues cards to cardholders, pays merchant acquirers for purchases made by the cardholders, and bills the cardholders.

Card network: A network for processing card transactions.

Check imaging: Check processing using a digital version of the check

Closed loop: Refers to an internal transaction processing path of an entity.

Closed loop network: The private payment network or internal private transaction processing network of an entity.

Debit card: A card which debits a cardholder's account, such as a checking account, for the cardholder's purchases.

Discount fee: A processing fee paid by a merchant to a merchant acquirer to cover the cost of processing a card transaction.

DDA or demand deposit account: A transaction account, such as a checking account.

External card processing network: A card processing network outside an entity's internal transaction processing path.

Global card association: A multi-national card association, such as MASTERCARD®, VISA®, or AMERICAN EXPRESS®.

Internal card processing network: The internal card processing platform of in entity including, without limitation, an internal debit card processor and an internal credit card processor.

Interchange fee: Fee paid by a merchant to a card issuer and a card processing network when the merchant accepts a card using a card association network.

Merchant acquirer: Contracts with a merchant to allow the merchant to accept credit and/or debit card and deposits funds from credit card sales into the merchant's account.

On-us transaction: A transaction received by an entity that has as a payment source a card issued by the entity.

Off-us transaction: A transaction received by an entity that has as a payment source a card issued by another entity.

Regional card association: A card association owned, for example, by a single bank or a group of banks, such as NYCE® or STAR®.

Regional card processing network: The card processing network of a regional card association that processes card transactions, usually at a lower processing cost than the card processing network of a global card association.

Various preferred embodiments of the invention have been described in fulfillment of various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for routing payment transactions electronically, comprising:
   receiving, using a payments interface processor, payment transactions by a financial institution consisting at least in part of credit or debit card payment transactions and at least on part of automated clearing house payment transactions, each of said payment transactions having both a payment source account and a payment destination account with the financial institution;
   routing, using the payments interface processor, said credit or debit card payment transactions to an internal credit or debit card payment transaction processor of the financial institution and said automated clearing house payment transactions to an internal automated clearing house payment transaction processor of the financial institution; and
   processing, using the internal credit or debit card payment transaction processor, said credit or debit card payment transactions by the internal credit or debit card payment transaction processor of the financial institution and said automated clearing house payment transactions by the internal automated clearing house payment transaction processor of the financial institution.

2. The method of claim 1, further comprising receiving, using the payments interface processor, payment transactions by the financial institution consisting at least in part of payment transactions not having both a payment source account and a payment destination account with the financial institution.

3. The method of claim 2, further comprising routing, using the payments interface processor, said payment transactions not having both a payment source account and a payment destination account with the financial institution to a payment transaction processor other than the internal credit or debit card payment transaction processor of the financial institution or the internal automated clearing house payment transaction processor of the financial institution.

4. The method of claim 1, wherein receiving said payment transactions further comprises receiving, using the payments interface processor, the payment transactions entered on a digital communication device.

5. The method of claim 4, wherein receiving the payment transactions entered on the digital communication device further comprises receiving the payment transactions via a merchant website.

6. The method of claim 1, further comprising interrogating each of said payment transactions to identify a payment destination account.

7. The method of claim 6, wherein identifying the payment destination account further comprises identifying, using the payments interface processor, a pre-paid merchant demand deposit account with the financial institution as the payment destination account.

8. The method of claim 6, wherein interrogating each of said payment transactions to identify the payment destination account further comprises identifying, using the payments interface processor, the payment source account from a directory of payment source accounts.

9. The method of claim 1, further comprising interrogating each of said payment transactions to identify a payment source account.

10. The method of claim 9, wherein identifying the payment source account further comprises identifying, using the payments interface processor, a debit card account, a credit card account, or a consumer demand deposit account as the payment source account from a look-up table of consumer accounts of the directory of payment source accounts.

11. The method of claim 10, wherein identifying the debit card account, the credit card account, or the consumer demand deposit account further comprises identifying, using the payments interface processor, the debit card account, the credit card account, or the consumer demand deposit account as the payment source account from a look-up table of consumer mobile numbers or email addresses linked to respective debit card accounts, credit card accounts, or consumer demand deposit accounts in the directory of payment source accounts.

12. The method of claim 1, further comprising settling, using the internal debit card payment transaction processor, said debit card payment transactions having both a payment source account and a payment destination account with the financial institution by debiting said payment source accounts with the financial institution and crediting said payment destination accounts with the financial institution.

13. The method of claim 1, further comprising batching, using the internal debit card payment transaction processor, the processed payment transactions and crediting the batched payment transactions to a payment destination account on a pre-determined periodic basis.

14. The method of claim 1, further comprising settling, using the internal credit card payment transaction processor, said credit card payment transactions having both a payment source account and a payment destination account with the financial institution, both as a merchant acquirer of the payment transaction and an issuer of the credit card account by the financial institution.

15. The method of claim 1, further comprising batching, using the internal credit card payment transaction processor, the processed credit card payment transactions and crediting the batched payment transactions to a payment destination account on a pre-determined periodic basis.

16. A system for routing payment transactions electronically, comprising:
   a payments interface processor coupled to memory, wherein the payments interface processor is programmed for:
   receiving payment transactions by a financial institution consisting at least in part of credit or debit card payment transactions and at least on part of automated clearing house payment transactions, each of said payment transactions having both a payment source account and a payment destination account with the financial institution, and routing said credit or debit card payment transactions to an internal credit or debit card payment transaction processor of the financial institution and said automated clearing house payment transactions to an internal automated clearing house payment transaction processor of the financial institution;

an internal credit card payment transaction processor coupled to memory, wherein the internal credit card payment transaction interface processor is programmed for:

processing said credit or debit card payment transactions; and an internal automated clearing house transaction processor coupled to memory, wherein the internal automated clearing house payment transaction processor is programmed for:

processing said automated clearing house payment transactions.

* * * * *